Figure 1:
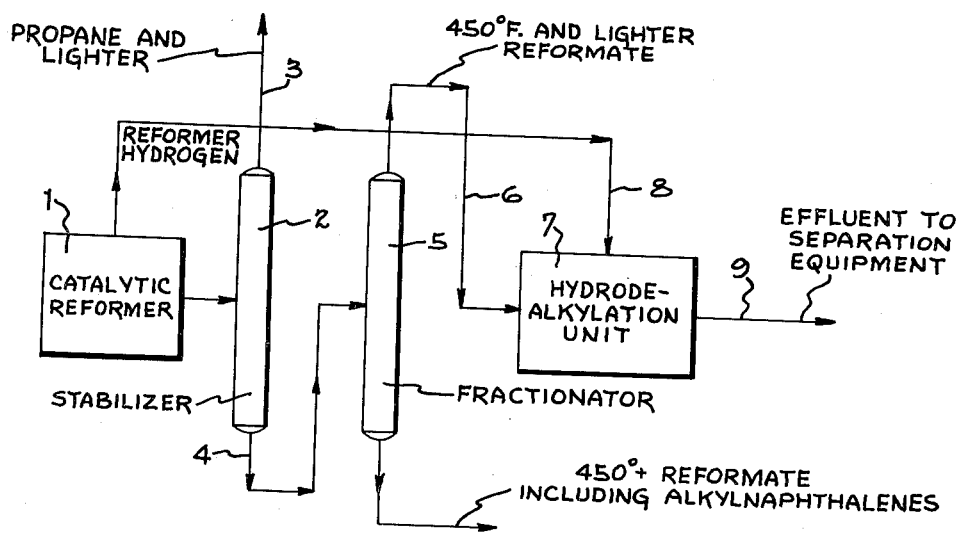

Sept. 25, 1962        T. H. PAULSEN        3,055,956
PROCESS FOR THE SEPARATION OF NAPHTHALENE
Filed Oct. 5, 1959                        2 Sheets—Sheet 1

INVENTOR
Thorwell H. Paulsen.
BY
Wood, Herron & Evans,
ATTORNEYS.

Sept. 25, 1962     T. H. PAULSEN     3,055,956
PROCESS FOR THE SEPARATION OF NAPHTHALENE
Filed Oct. 5, 1959     2 Sheets-Sheet 2

INVENTOR
Thorwell H. Paulsen.
BY
Wood, Herron & Evans,
ATTORNEYS.

United States Patent Office 3,055,956
Patented Sept. 25, 1962

3,055,956
PROCESS FOR THE SEPARATION
OF NAPHTHALENE
Thorwell H. Paulsen, Ashland, Ky., assignor to Ashland Oil & Refining Company, Ashland, Ky., a corporation of Kentucky
Filed Oct. 5, 1959, Ser. No. 844,324
16 Claims. (Cl. 260—674)

This invention relates to a process for recovering naphthalene from various petroleum hydrocarbon fractions, and is particularly concerned with a process by which naphthalene may be recovered from petroleum derivatives containing both monocyclic and bicyclic aromatics. This application is a continuation-in-part of my copending application Serial No. 728,620, filed April 15, 1958, now Patent No. 2,951,886, issued September 6, 1960.

At the present time, nearly all of the naphthalene produced in the United States is obtained by the distillation of coal tar, a byproduct of the manufacture of coke. In consequence of this, naphthalene product has inherently varied with the production of coke for the steel industry, and its price has fluctuated widely. The chemical industry has recently come to require naphthalene in larger quantities than can be produced by the distillation of available coal tar.

Petroleum, or more exactly, petroleum synthesis products, are a potentially attractive source of naphthalene except for the high cost of previous processes. Two methods have been proposed in the past for the production of naphthalene from petroleum.

The first method is the direct hydrodealkylation of alkylnaphthalenes, which can be produced in large quantities by such refining techniques as catalytic reforming, catalytic cracking and hydroforming. Such alkylnaphthalenes typically comprise monomethyl-, dimethyl-, trimethyl-, tetrahyethyl-, methylethyl-, methylisopropyl-, and dimethylethylnaphthalenes, and more complex compounds, admixed with one another. For the production of naphthalene from such materials, the feed stock is mixed with hydrogen, and then passed over a dealkylation catalyst at elevated temperatures and pressures to convert the alkylnaphthalenes to naphthalene. The main advantage of this general method is the relatively high concentration of alkylnaphthalenes in such refinery product streams as from catalytic crackers.

The second method of obtaining naphthalene from petroleum is that of extracting naphthalene already present in refinery product streams by the use of a selective solvent. For example, a method which has been proposed is to extract the naphthalene from a stream using methanol or ethanol as the extraction solvent, and then recovering the naphthalene from the solvent by distillation and/or crystallization. This method has been generally deemed uneconomical because, although the total amount of naphthalene present in refinery streams may be large, the quantities of extraction solvent required are too great to be handled economically.

The present invention is directed to a new process whereby naphthalene may be recovered from petroleum fractions to meet the economic need. Briefly, the process comprises the separation from a hydrocarbon mixture containing alkylbenzenes and naphthalene but containing no alkylnaphthalenes. Such fraction is subjected to hydrodealkylation over a specialized catalyst which converts alkylbenzenes in the fraction to benzene, but which does not affect, at least to any appreciable extent, the naphthalene in the fraction. The advantage of the process is that high boiling alkylbenzenes, for example,

| | °F. |
|---|---|
| 1,2,4 trimethyl-6 ethylbenzene | 415.4 |
| 1,2,3 trimethyl-5 ethylbenzene | 420.4 |
| 1,2,4 trimethyl-3 ethylbenzene | 421.9 |
| 1,2,3 trimethyl-4 ethylbenzene | 428.7 |
| n-Hexylbenzene | 435.2 | are separated from naphthalene, boiling at 424.3° F., by their conversion to benzene, boiling at 176.2° F. The dealkylated product thus comprises a mixture essentially of two components, benzene and naphthalene. The mixed product readily lends itself to simple fractionation or crystallization of the respective components from one another. Both the naphthalene and benzene so produced are comparable in cost and definitely superior in purity to the comparable coal tar products.

A preferred feed stock upon which the process is adapted to be practiced comprises a catalytic reformate which is relatively rich in aromatic content and which contains a relatively high percentage of naphthalene. However, the process may be effectively employed on any feed stock containing naphthalene, although its economic advantage is, of course, greatest where the naphthalene content is large.

Although the process is primarily described hereinafter with reference to a petroleum feed stock, it should be noted that coal tar or other fractions containing naphthalene are also suitable as feed stocks for the process.

Most aromatic hydrocarbons, regardless of their source, contain as major impurities sulfur compounds such as thiophenes and high boiling sulfur ring compounds. These compounds display boiling points close to that of naphthalene, and, therefore, cannot be removed by fractionation procedures. As an incident of the separation of naphthalene in accordance with the invention, the dealkylation step removes sulfur impurities from the mixed benzene-naphthalene intermediate product. Inasmuch as sulfur impurities in either benzene or naphthalene are detrimental in many of the chemical reactions in which these products are used, the inherent purification effected by this process affords a distinct advantage over destructive distillation processes.

Through the combination of prefractionation, dealkylation and separation steps, the invention effects the concomitant separation of benzene and naphthalene from a readily available feed stock in excellent yields, i.e., the conversion of alkylbenzenes to benzene is exceptionally high, even in excess of 90% in a single pass over the specialized catalyst.

From the foregoing, it can be seen that the recovery of naphthalene present in admixture with other compounds having boiling points near its own is achieved in the present process by converting those other compounds to a single lighter material, benzene, which may then be readily separated from naphthalene by well known techniques. Were it not for this conversion, a solvent extraction would be required, as in the past, to separate the alkylbenzene compounds from the naphthalene.

In the past, various proposals have been made to dealkylate a benzenoid hydrocarbon mixture in the expectation of selectively removing alkyl groups to increase the benzene content of the mixture. In general, the dealkylation of alkylbenzenes of the type in which the alkyl group contains two or more carbon atoms is quite good. However, the removal of methyl groups as, for example, from toluene and xylene, has not been commensurately satisfactory. In the presence of conventional catalysts and at a temperature sufficiently high to effect cracking of impurities the reaction becomes non-selective, and extensive scission of benzene rings occurs along with the splitting of alkyl groups; only a small amount of liquid end product is obtained along with large quantities of coke, butane, and lighter hydrocarbons. On the other hand, if slightly lower temperatures are employed, to prevent destructive cracking of valuable components, the conversion of methylbenzenes into benzene is very poor even at prolonged contact time. Hence, by conventional processing a complex mixture of products is obtained and the separation of naphthalene from the mixture is difficult.

For the practice of the invention, it has been found specifically that a catalyst consisting of approximately 10–15% by weight of chromium oxide on a high purity, low sodium content, gamma type alumina support is capable, in the presence of hydrogen, of dealkylating substituted benzenes present in reformates or the like, and concurrently removing sulfur-bearing impurities, with little coking effect, at temperatures above 1200° F. Otherwise expressed, we have discovered that a catalyst of the type specified and under the conditions indicated will selectively split off alkyl groups attached to benzene rings without splitting naphthalene, so that excellent conversion of the available alkylbenzene compounds to benzene is obtained, and whereby the separation of naphthalene may thereafter be easily accomplished.

One catalyst which enables such results to be obtained, in contrast to the poor results obtained in the use of conventional chromia and other catalysts on conventional supports, is commercially available from The Girdler Construction Division of Louisville, Kentucky, under their trade designation G–41. X-ray diffraction patterns show the chromium oxide to be present in the form of hexagonal crystals, as distinguished from chromia alumina co-gel catalysts which have also been available but which are incapable of providing similar results. The total chromia content of the commercial product is approximately 11.8% $Cr_2O_3$ by weight, the remainder of the product being the specified high purity, low sodium content, gamma type alumina.

The catalyst is preferably employed in the form of tablets, for example, 3/16" x 3/16" in size, forming a fixed bed through which the feed stock and hydrogen are passed continuously. However, other tablet sizes may be used, in single or multiple fixed bed reaction systems or moving bed reaction systems. Likewise, pulverized catalyst may be employed in a fluidized type reactor. The only limitation in reactor design is the satisfactory contacting of feed with catalyst at the prescribed space rates. Furthermore, the catalyst may be periodically regenerated by burning off coke deposits, as is more fully described below.

The dealkylation step of the invention is effected by contacting the prefractionated charge with the catalyst and hydrogen at a temperature in the range from 1200–1400° F., and preferably at a temperature of approximately 1350° F., a pressure in the range from 100 to 1000 p.s.i.g. and preferably about 500 p.s.i.g. and at a weight hourly space velocity in the range from about 0.5 to 3.0 and preferably about 1.0. The molar ratio of hydrogen to hydrocarbon feed stock is not critical and may be in the range from 3:1 to 10:1, and is preferably approximately 6:1. For economic operation, the ratio should be adjusted to give minimum coking, in accordance with well-known techniques.

Within the contact zone, dealkylation occurs rapidly, but, unexpectedly, even at the high temperature indicated there is little destructive cracking of hydrocarbons into coke or normally gaseous products and little formation of saturated products. In the cracking zone, alkyl groups split off the alkylbenzenes to yield benzene, while the sulfur impurities are converted into hydrogen sulfide and paraffin impurities are cracked to low molecular weight hydrocarbon gases. The normally liquid products are then subjected to fractionation or crystallization to separate naphthalene from the other components.

The general types of reaction carried out in the present process are as follows:

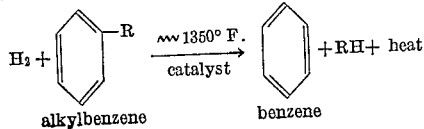

and

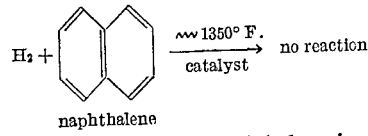

In general, the isolation of naphthalene in the product mixture from other compounds having boiling points close to its own, increases with increasing reactor temperature, (up to that point at which the naphthalene itself begins to be cracked) as the result of the fact that the impurities in its boiling range and the higher boiling alkylbenzenes are more completely cracked at higher reactor temperatures. The thiophene impurities present in the charge are broken up into $H_2S$ and saturated hydrocarbons at relatively low temperatures; paraffins are the next group to crack with increasing temperature. However, if the temperature is increased beyond the temperature at which the alkylbenzenes are dealkylated, the naphthalene then itself begins to split into alkylbenzenes, which are converted to benzene, because the optimum temperature has been exceeded. Saturation of ring compounds does not occur to any significant extent because at the temperatures involved, the equilibrium points lie far toward the side of unsaturation.

In the following examples and the accompanying drawings are illustrated three typical methods of practicing the invention.

Figure 3:
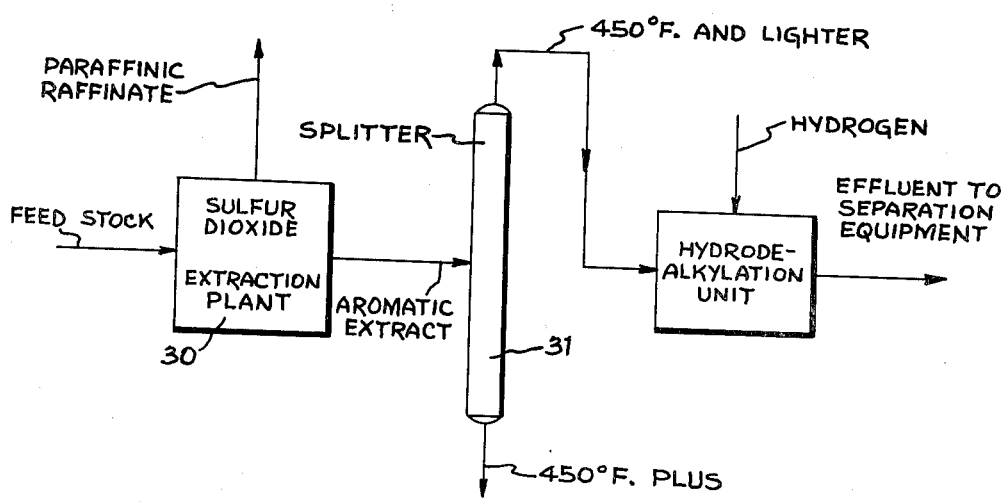
Figure 2:
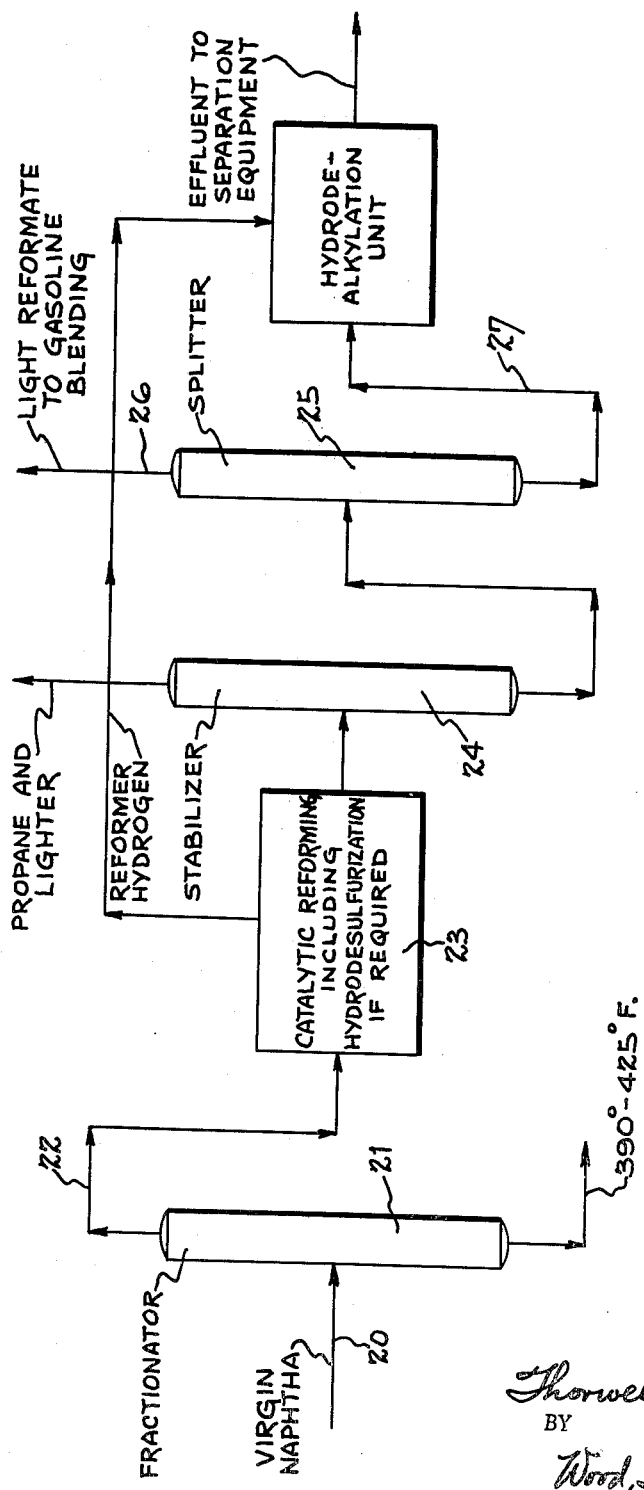

FIGURE 1 is a flow sheet of a method of recovering naphthalene from a catalytic reformate;
FIGURE 2 is a flow sheet of a method of obtaining naphthalene from naphtha; and
FIGURE 3 is a flow sheet of a method of obtaining naphthalene from kerosene or catalytically cracked light cycle oils.

EXAMPLE 1

One method of practicing the invention continuously on a commercial scale at an adjunct to a petroleum refining operation at which a reformate feed stock is available is illustrated in FIGURE 1.

Reformate from a catalytic reformer indicated at 1 is fed to a stabilizer 2 wherein volatile light hydrocarbon gases (propane and lighter) are driven off through line 3. The stabilized product is withdrawn through line 4 and passes to a fractionator 5. In the fractionator the reformate is cut to yield a fraction having an initial boiling point of about 300° F. and a final boiling point of about 450° F. This cut contains alkylbenzenes and naphthalene, but contains no alkylnaphthalenes, the lowest members of which have boiling points as follows:

1-methylnaphthalene _____ 472.4° F.
2-methylnaphthalene _____ 465.9° F.
1-ethylnaphthalene _____ 497.6° F.
2-ethylnaphthalene _____ 496.2° F.

From the fractionator, the light (alkylbenzene) cut moves through line 6 to a hydrodealkylation unit indicated generally at 7.

Hydrogen, which may be off-gas from the reformer, is added through line 8. A heater raises the temperature of the hydrogen-feed stock mixture to a level at which hydrodealkylation of the feed stock is effected. As noted, this temperature is in the range from 1200°–1400° F., and is preferably about 1350° F. Since the dealkylation reaction is itself exothermic, the feed may be heated prior to its introduction into the reactor to a temperature somewhat less than the preferred 1350° F. temperature at which conversion is effected. For example, where the dealkylation is to be conducted at a temperature within the reactor of 1350° F. the feed temperature may be approximately 1250° F. The feed temperature thus provides a convenient means of adjusting the temperature in the reaction zone. Alternatively, the reactor may be surrounded with a heat exchanger to carry off the heat generated by the reaction. Reactor temperature also will vary of course, with the weight hourly space velocity of the feed stock in the reactor.

After heating, the hot gas is introduced into the reactor, and passed over a fixed bed of catalyst. A pressure of approximately 500 p.s.i.g. is maintained in the reactor. As noted, the reactor pressure may be varied from approximately 100 to 1000 p.s.i.g., the intermediate pressure described herein being an operating pressure which it is practical to employ.

The reactor is not of a critical design. It is only necessary to dispose the catalyst so that it comes into contact with the feed stock and hydrogen. The weight hourly space velocity, that is, the number of pounds of feed stock introduced per hour into the reactor per pound of catalyst, is preferably about 1.0; typical reaction time is of the order 3–6 seconds, although neither of these figures is in any sense critical since time and temperature are interrelated to some extent.

The partial pressure of hydrogen in the reactor should be adjusted, in accordance with well known procedures, to produce minimum coking in the reactor. Sufficient hydrogen must, of course, be added to effect dealkylation, saturate the alkyl groups removed from the alkylbenzenes, and minimize subsequent cracking of naphthalene.

Under the conditions indicated, catalyst life is good. Coke deposits in significant quantities are not deposited on the catalyst provided an adequate hydrogen pressure is maintained. When the catalyst does become inactive due to coke deposits, it can be regenerated by burning off the coke deposits with air at high temperature.

The hydrodealkylation effluent is withdrawn through line 9 and is then condensed and stabilized whereby the volatile light hydrocarbon gases are removed. These steps are conventional and are not illustrated. The bottom product coming from the stabilizer comprises a mixture primarily of benzene and naphthalene, although some toluene may be present at low reactor temperatures. These are separated by fractionation or crystallization.

The purity of the naphthalene removed from the feed stock mixture is excellent, as indicated by the following:

| Dealkylation Temperature | Freeze Pt., ° C. | Purity, Mol Percent |
|---|---|---|
| 1,250 | 79.26 | 98.1 |
| 1,300 | 79.66 | 98.9 |
| 1,350 | 79.81 | 99.1 |
| 1,400 | 79.91 | 99.3 |

Reaction pressure _____ p.s.i.g__ 510
Weight hourly space velocity_____ 0.94
$H_2$/hydrocarbon mol ratio_____ 8 to 1

EXAMPLE 2

A method in which the invention may be practiced on a virgin petroleum naphtha is illustrated in FIGURE 2. Naphtha boiling in a range of 300–425° F. is fed through line 20 to a fractionator 21 wherein it is split into a lighter cut having an end boiling point of 390° F. and a heavier cut boiling in the range of from 390–425° F. The lighter cut, withdrawn through line 22, contains alkylcyclohexanes as well as the cis and trans forms of decahydronaphthalene. Alkyldecahydronaphthalenes are eliminated inasmuch as they have boiling points as follows:

1-methyl-(cis-decahydronaphthalene) _____ 469.0° F.
1-methyl-(trans-decahydronaphthalene) _____ 455.0° F.
2-methyl-(cis-decahydronaphthalene) _____ 421.0° F.
2-methyl-(trans-decahydronaphthalene) _____ 406.0° F.
9-methyl-(cis-decahydronaphthalene) _____ 419.0° F.
9-methyl-(trans-decahydronaphthalene) _____ 401.0° F.

This light naphtha cut is catalytically reformed at 23 and hydrodesulfurized if necessary, both of which steps are well known. For example, the naphtha may be reformed over a platinum catalyst at conditions of about 900–950° F. and 200–600° p.s.i.g., a weight hourly space velocity of between 1.5 to 5.0, and a hydrogen to hydrocarbon ratio of 3:1 to 10:1. The reformate is stabilized at 24 to remove propane and lighter gases, and fractionated at 25 into a light fraction for gasoline blending which is withdrawn through line 26 and a heavier fraction, which is drawn off through line 27 for naphthalene recovery, by a hydrodealkylation process as previously described in Example 1.

A typical dealkylated product is as follows:

*Dealkylation Yields on 395° F. Reformate*

Operating conditions:
  WHSV _____ 1.3
  Temperature (° F.)_____ 1320
  Pressure (p.s.i.g.)_____ 555
  $H_2$/HC _____ 7.9

Yields (wt. percent on feed):
  Benzene _____ 8.5
  Toluene _____ 5.4
  Naphthalene _____ 44.7

Toluene yield may be diminished by increasing the operating temperature. The product is then fractionated as in Example 1.

EXAMPLE 3

Other petroleum fractions may be used as feed stock for the process, as is shown in FIGURE 3. For example, kerosene may comprise the feed stock. The aromatic content of kerosene is extracted by a sulfur dioxide extraction step indicated at 30, which procedure is well known. From the aromatic extract a splitter 31 divides a fraction having an end boiling point of 450°, which is then dealkylated and fractionated as before.

Alternatively, a fluid catalytic light cycle oil may comprise the feed stock to the $SO_2$ extraction plane for treatment generally similar to that of the kerosene. Still another alternative is to hydrocrack a prefractionated light cycle oil to effect the removal of paraffins and olefins. This step is then followed by hydrodealkylation and fractionation.

The process is applicable to coal tar products from which a fractionated light oil is dealkylated to produce benzene and high purity sulfur free naphthalene.

Having described my invention, I claim:

1. A process for recovering naphthalene from a petroleum catalytic reformate containing naphthalene, alkylbenzenes and alkylnaphthalenes, said process comprising, separating the alkylnaphthalenes and high boiling alkylbenzenes by fractionation from said reformate, hydrodealkylating the remainder by subjecting it to a catalyst comprising approximately 10 to 15% by weight of chromium oxide on a high purity low sodium content gamma type alumina support, at a temperature in the range from approximately 1200° F. to 1400° F., at a pressure in the range from 100 to 1000 p.s.i.g., at a weight hourly space velocity in the range from about 0.5 to 3.0 and at a hydrogen to hydrocarbon ratio in the range from 3:1 to 10:1, whereby the alkylbenzenes in said remainder are converted to lower boiling alkylbenzenes and benzene, and fractionating the naphthalene from the lower boiling alkylbenzenes and benzene so produced.

2. A process for recovering naphthalene from a feed stock containing alkylbenzenes, naphthalene, and alkylnaphthalenes, said process comprising, fractionating said feed stock into a light fraction containing naphthalene and alkylbenzenes, and a heavy fraction containing alkylnaphthalenes and alkylbenzenes boiling substantially higher than naphthalene, hydrodealkylating said light fraction by subjecting it to a catalyst comprising approximately 10 to 15% by weight of chromium oxide on a high purity low sodium content gamma type alumina support, at a temperature in the range from approximately 1200° F. to 1400° F., at a pressure in the range from about 100 to 1000 p.s.i.g., at a weight hourly space velocity in the range from about 0.5 to 3.0, and at a hydrogen to hydrocarbon ratio in the range from about 3:1 to 10.1, whereby the alkylbenzenes present in the fraction are converted to lower boiling compounds, and fractionating the naphthalene from the lower boiling compounds so produced.

3. A process for recovering naphthalene from a petroleum catalytic reformate containing alkylbenzenes, naphthalene and alkylnaphthalenes, said process comprising, separating from said reformate a fraction boiling in the range from 300–450° F., hydrodealkylating said fraction by subjecting it to a catalyst comprising approximately 10 to 15% by weight of chromium oxide on a high purity low sodium content gamma type alumina support, at a temperature in the range from approximately 1200° F. to 1400° F., at a pressure in the range from 100 to 1000 p.s.i.g., at a weight hourly space velocity in the range from about 0.5 to 3.0, and at a hydrogen to hydrocarbon ratio in the range from 3:1 to 10:1, whereby the alkylbenzenes in said fraction are converted to lower boiling alkylbenzenes and benzene, and fractionating the naphthalene from the lower boiling alkylbenzenes and benzene so produced.

4. The process of claim 3 wherein the temperature is approximately 1350° F.

5. The process of claim 3 wherein the hydrogen is supplied in the form of a hydrogen-rich off gas obtained from a catalytic reformer.

6. The process of claim 3 wherein the catalyst consists of approximately 11.8% chromia on the said support.

7. The process of claim 3 wherein the chromia is in the form of hexagonal crystals.

8. The process of claim 3 wherein the hydrodealkylation is conducted by passing a stream of said reformate through a fixed bed of said catalyst.

9. The process of claim 3 wherein the pressure is about 500 p.s.i.g.

10. The process of claim 3 wherein the weight hourly space velocity is about 1.0.

11. A process for recovering naphthalene from a hydrocarbon feed stock containing naphthalene and alkylbenzenes boiling in the naphthalene range, said process comprising, fractionating from said feed stock those compounds having boiling points substantially higher than that of naphthalene, hydrodealkylating the remainder by subjecting it to a catalyst comprising approximately 10 to 15% by weight of chromium oxide on a high purity low sodium content gamma type alumina support, at a temperature in the range from approximately 1200° F. to 1400° F., at a pressure in the range from 100 to 1000 p.s.i.g., at a weight hourly space velocity in the range from about 0.5 to 3.0, and at a hydrogen to hydrocarbon ratio in the range from 3:1 to 10:1, whereby the alkylbenzenes in said remainder are converted to lower boiling alkylbenzenes and benzene, and separating the naphthalene from the lower boiling alkylbenzenes and benzene so produced.

12. The process of obtaining naphthalene from naphtha comprising, separating from naphtha a fraction having an end boiling point of about 390° F., reforming the fraction to produce alkylbenzenes and naphthalene, separating the reformate into a light fraction and a heavy fraction, subjecting the heavy fraction to hydrodealkylation over a catalyst comprising approximately 10 to 15% by weight of chromium oxide on a high purity low sodium content gamma type alumina support, at a temperature above about 1200° F., at a pressure in the range of from 100 to 1000 p.s.i.g., at a weight hourly space velocity in the range from about 0.5 to 3.0, and at a hydrogen to hydrocarbon ratio in the range from 3:1 to 10:1, whereby the alkylbenzenes are converted to compounds boiling substantially lower than naphthalene, and fractionating the naphthalene from the compounds so produced.

13. A process for separating naphthalene and benzene from a feed stock containing alkylbenzenes, naphthalene, and alkylnaphthalenes, said process comprising, separating from said feed stock a fraction boiling in the range from 300–450° F., hydrodealkylating said fraction by subjecting it to a catalyst comprising approximately 10 to 15% by weight of chromium oxide on a high purity low sodium content gamma type alumina support, at a temperature in the range from about 1200° F. to about 1400° F., in the presence of hydrogen, whereby the alkylbenzenes present in the fraction are converted to lower boiling alkylbenzenes and benzene, and fractionating naphthalene and benzene from the alkylbenzenes so produced.

14. A process for obtaining naphthalene and benzene from a hydrocarbon mixture containing aromatic compounds, said process comprising, extracting the aromatic compounds from said hydrocarbon, splitting from the aromatic extract a fraction having an end boiling point of about 450° F., hydrodealkylating said fraction in the presence of hydrogen and a catalyst consisting of approximately 10 to 15% by weight of chromium oxide on a high purity low sodium content gamma type alumina support at a temperature of above approximately 1200° F., and not above about 1400° F., whereby benzene is produced and naphthalene is isolated in its boiling range, and fractionating the naphthalene and benzene so produced.

15. A process for recovering naphthalene from a hydrocarbon feed stock containing naphthalene and akylbenzenes boiling close to and above the boiling point of naphthalene, said process comprising, fractionating said stock to an end boiling point such that alkylbenzenes boiling higher than naphthalene are substantially excluded from said stock, hydrodealkylating said stock in the presence of hydrogen and a catalyst comprising approximately 10 to 15% by weight of chromium oxide on a high purity low sodium content gamma type alumina support at a temperature above about 1200° F., at a weight hourly space velocity in the range from about 0.5 to 3.0, and at a hydrogen to hydrocarbon ratio in the range from 3:1 to 10:1, whereby the alkylbenzenes present in the stock are at least partially dealkylated, and fractionating the naphthalene from the dealkylated stock so produced.

16. A process for recovering naphthalene from a hydrocarbon feed stock containing naphthalene and alkylbenzenes, said process comprising, fractionating said stock to an end boiling point such that alkylbenzenes boiling higher than naphthalene are substantially excluded from said stock, subjecting the remainder of said stock in the presence of hydrogen to a catalyst comprising approximately 10 to 15% by weight of chromium oxide on a high purity low sodium content gamma type alumina support at a temperature above 1200° F., at a weight hourly space velocity in the range from about 0.5 to 3.0, and at a hydrogen to hydrocarbon ratio in the range from about 3:1 to 10:1, whereby the alkylbenzenes present in said remainder are at least sufficiently dealkylated to enable said naphthalene to be separated from the dealkylated stock so produced by fractionation, and fractionating said naphthalene from the dealkylated stock so produced.

References Cited in the file of this patent

UNITED STATES PATENTS

| | | |
|---|---|---|
| 2,727,854 | Brown et al. | Dec. 20, 1955 |
| 2,734,929 | Doumani | Feb. 14, 1956 |
| 2,773,917 | Coonradt et al. | Dec. 11, 1956 |
| 2,916,533 | Kemp et al. | Dec. 8, 1959 |
| 2,951,886 | Paulsen | Sept. 6, 1960 |

FOREIGN PATENTS

| | | |
|---|---|---|
| 667,145 | Great Britain | Feb. 27, 1952 |

OTHER REFERENCES

Altieri: Gas Chemists' Book of Standards, 1943, pub. by American Gas Assoc., Inc., page 17. (Copy in Division 31.)